US007248379B2

(12) United States Patent
Yoshioka

(10) Patent No.: US 7,248,379 B2
(45) Date of Patent: Jul. 24, 2007

(54) IMAGE PROCESSING APPARATUS, PROGRAM PRODUCT FOR SETTING IMAGE PROCESSING OPERATION, AND IMAGE PROCESSING SYSTEM

(75) Inventor: Tetsuya Yoshioka, Suita (JP)

(73) Assignee: Kyocera Mita Corporation, Osaka (JP)

( * ) Notice: Subject to any disclaimer, the term of this patent is extended or adjusted under 35 U.S.C. 154(b) by 924 days.

(21) Appl. No.: 10/373,511

(22) Filed: Feb. 25, 2003

(65) Prior Publication Data
US 2003/0164972 A1    Sep. 4, 2003

(30) Foreign Application Priority Data
Mar. 1, 2002    (JP)    ............................. 2002-055663

(51) Int. Cl.
*G06F 15/00* (2006.01)
*B41B 1/00* (2006.01)
*G03G 15/00* (2006.01)
(52) U.S. Cl. .................... 358/1.13; 358/1.15; 358/1.9; 358/1.16; 399/12; 399/80; 399/81; 707/2; 707/10; 707/102; 707/205; 709/203; 709/226

(58) Field of Classification Search ............... 358/1.13, 358/1.15, 1.16, 1.9; 707/102, 2, 10, 205; 709/223, 226, 203; 399/12, 80, 81
See application file for complete search history.

(56) References Cited

U.S. PATENT DOCUMENTS

| 5,774,667 | A | * | 6/1998 | Garvey et al. ............... 709/222 |
| 6,029,198 | A | * | 2/2000 | Iizuka ......................... 709/223 |
| 6,349,304 | B1 | * | 2/2002 | Boldt et al. .................. 707/102 |
| 6,449,056 | B1 | * | 9/2002 | Mishima et al. ........... 358/1.16 |

* cited by examiner

*Primary Examiner*—Aung S. Moe
*Assistant Examiner*—Scott A Schlack
(74) *Attorney, Agent, or Firm*—Jordan and Hamburg LLP

(57) ABSTRACT

Image processing operations, such as settings of copying conditions of a copier, are facilitated, with the setting being made on a terminal such as a personal computer or other copier.

Data of the image processing operation settings to be executed by an image processing apparatus, are set on a terminal such as a personal computer which is interconnected with the image processing apparatus through LAN, and to which a user has been accustomed in operation. The set data are transmitted to the image processing apparatus and names of the image processing operations are displayed on a display window of the image processing apparatus, as candidates to be executed by the apparatus.

3 Claims, 9 Drawing Sheets

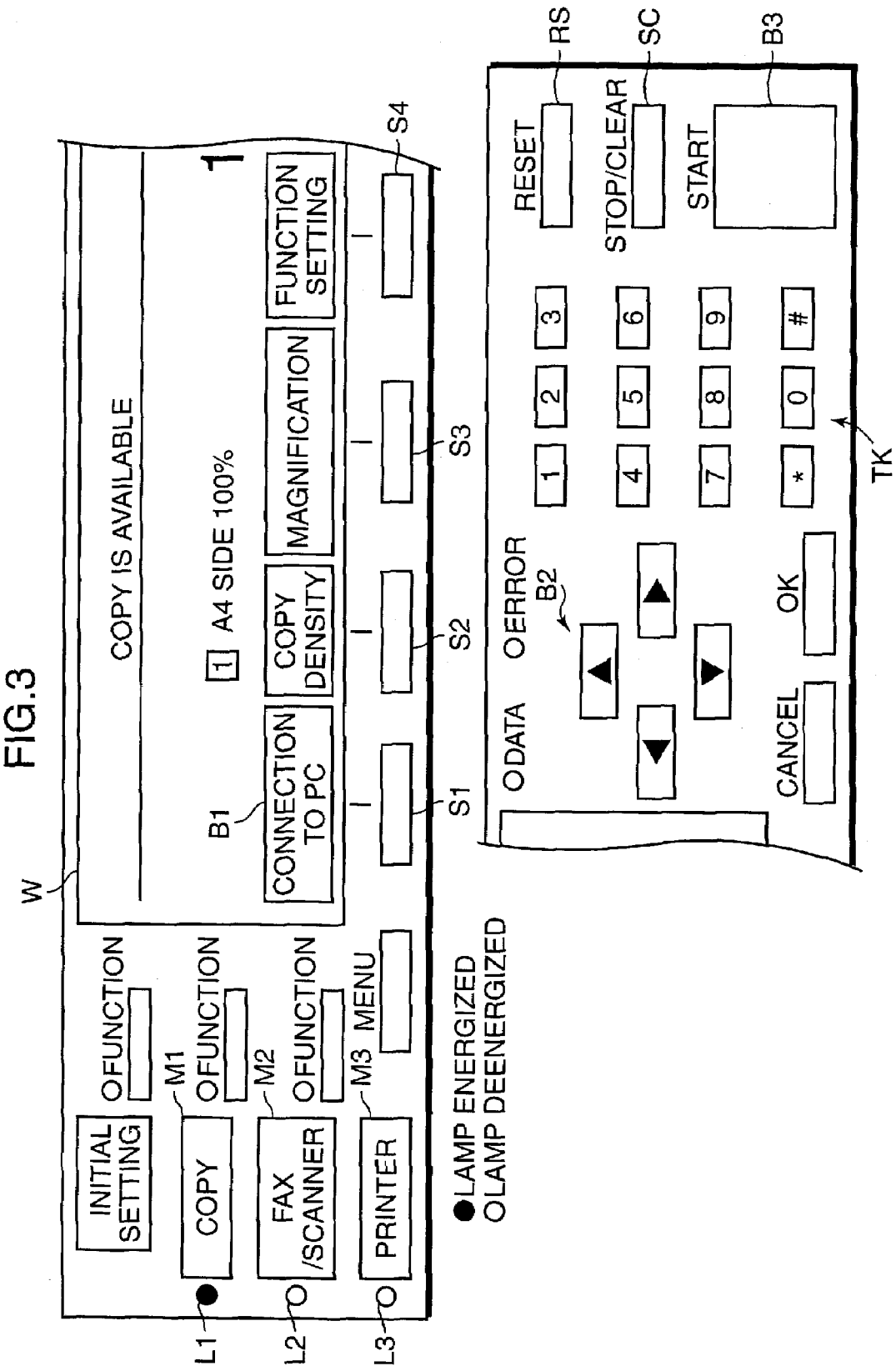

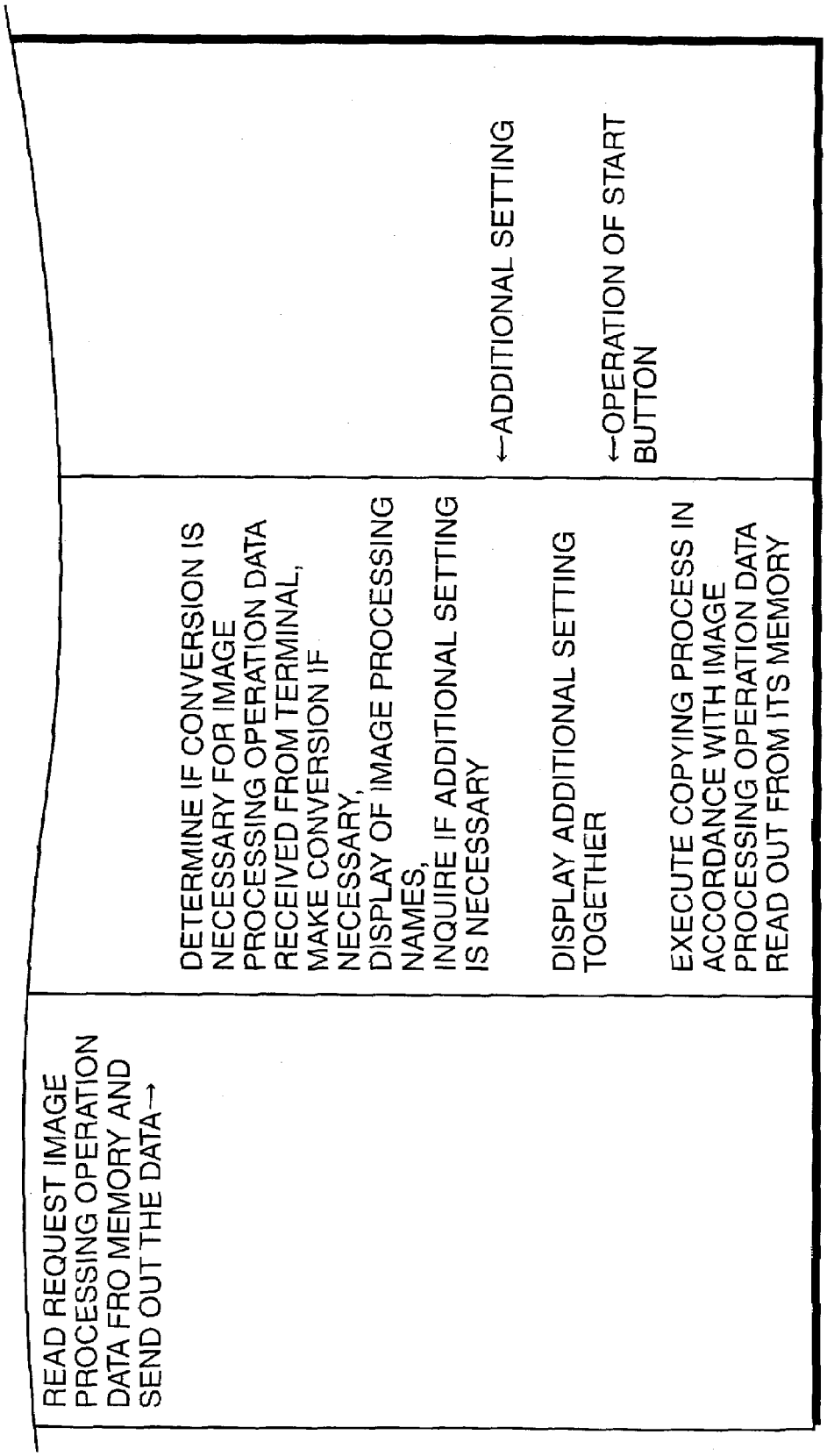

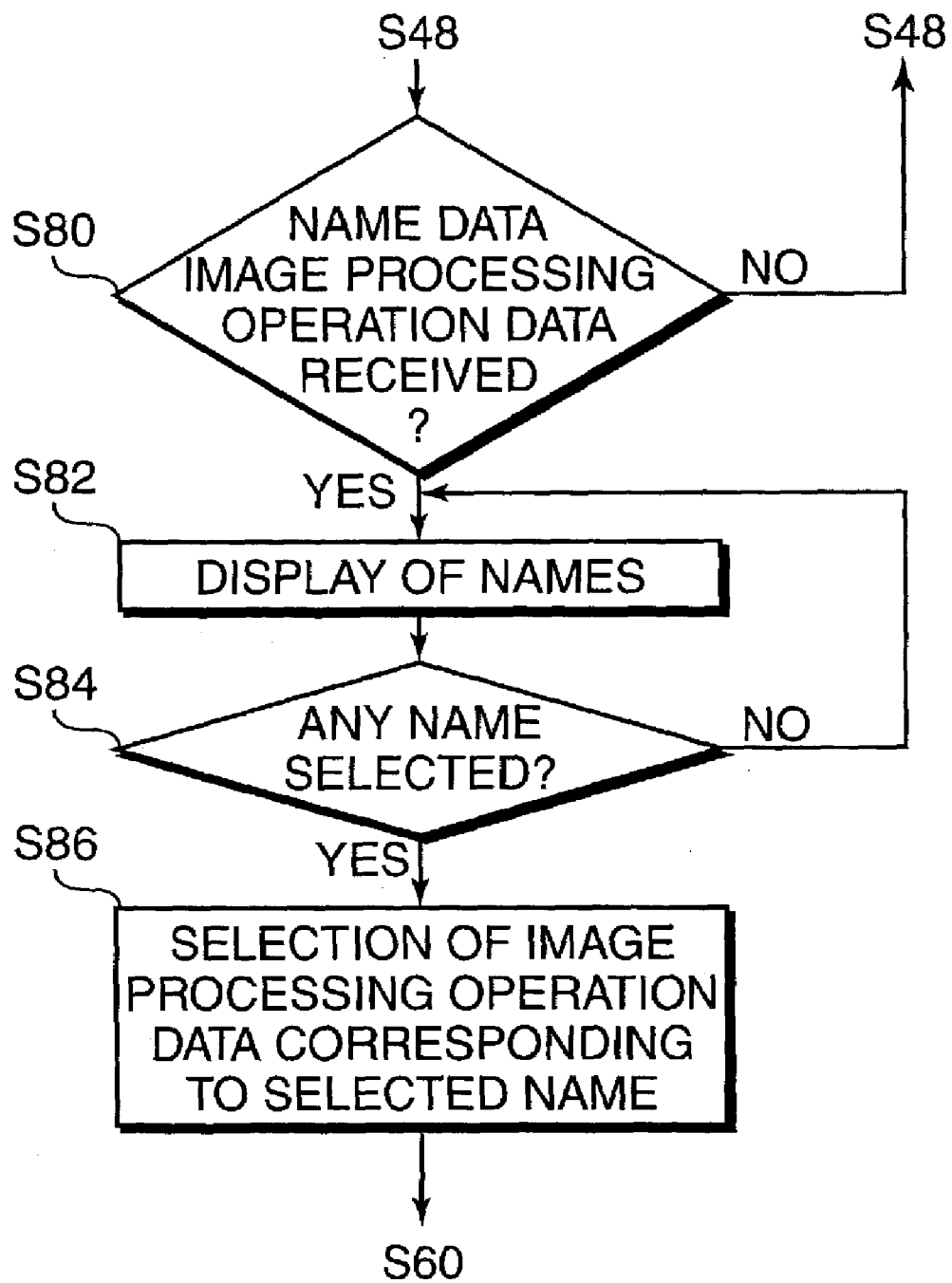

IMAGE PROCESSING APPARATUS, PROGRAM PRODUCT FOR SETTING IMAGE PROCESSING OPERATION, AND IMAGE PROCESSING SYSTEM

BACKGROUND OF THE INVENTION AND RELATED ART STATEMENT

1. Field of the Invention

The present invention relates to a setting of image processing operations for an image processing apparatus such as a copier, facsimile machine, and a scanner, and more particularly pertains to an image processing operation setting for an image processing system in which one or more terminal devices, such as a personal computer, work station, sever and the like, are connected with one or more image processing apparatus to communicate each other through a network. The invention also relates to an image processing device and a program product for the image processing operation setting to be used in such a system.

2. Description of the Related Art

Recently, the image processing apparatus such as a copier, facsimile machine and scanner, is provided with high and rich functions which complicate setting operations for setting image processing operations executed by the image processing apparatus. Such setting operations are generally different with the manufactures, types and kinds of the image processing apparatus. The difference of the setting operations are not only in the process of the operations but in the names of the operations with different apparatus. For example, as to an operation to copy a plurality of images read from a plurality of originals on a single copy paper with the images being contracted, a type of a copier calls that operation as a collective or gathering copy while the other copier call it as two-in-one or four-in one copy, or layout copy, while such names are displayed on a predetermined display portion.

Also, recent development of computer technology improved network system including the image processing apparatus, and widely used are image processing systems in which an image processing apparatus is interconnected with one or more information processing devices such as personal computers, work stations, and a server, and with one or more other image processing devices to communicate with one another. In such image processing systems, it often occurs that different types of image processing apparatus are connected in the system.

However, as mentioned above, the recent image processing apparatus become complicated in their manipulation, and different apparatus require different manner of manipulation, and it takes much time for a user to be accustomed with the manner of the manipulation of each apparatus.

If a plurality of different types of image processing apparatus are introduced, it will be more difficult for the user to be accustomed with the operations of the apparatus since he or she has to learn the manner of the complicated operations for each apparatus.

SUMMARY OF THE INVENTION

Accordingly, an object of the present invention is to provide an image processing apparatus which can be easily manipulated or operated.

Another object of the present invention is to provide a communication system between a terminal device and an image processing device which facilitates setting of image processing operation.

Still another object of the present invention is to provide a program product to be used in a terminal device which is interconnected with an image processing apparatus to set the operations of the image processing apparatus. The program facilitates ,the setting of the operations of the image processing apparatus.

Further object of the present invention is to provide an image processing apparatus, a program products for setting operations of the image processing apparatus, and an image processing system which facilitate setting of the operations of the image processing apparatus regardless of the types and kinds of the image processing apparatus.

To attain one or more of the above-mentioned objects, an image processing apparatus according to an aspect of the present invention is adapted to be interconnected with one or more terminal devices including one or more of terminal devices and/or one or more image processing apparatus, to communicate with each other. The image processing apparatus comprises an input unit to be manipulated for a predetermined input operation, a data obtaining unit responsive to the input to the input unit to obtain, from the terminal device, one or more image processing setting data set on the terminal device so as to be executed by the image processing apparatus, and an image processing unit for executing image processing in accordance with the image processing operation setting data obtained by the data obtaining unit.

According to the aspect of the invention as mentioned above, if the user set the image processing operations on a terminal, such as a personal computer, work station, sever and other data processing device or other image processing apparatus to which he or she has accustomed to operate, he or she may only instruct the image processing apparatus to obtain the set data, then the image processing apparatus executes desired image processing operations.

According to an aspect of an embodiment of the invention, the image processing apparatus may be provided with a converter for converting the image processing operation setting data obtained from the terminal, into a format adapted for the image processing apparatus itself. This configuration is useful when different type of image processing apparatus have different format of image processing operation setting data.

According to another aspect of the embodiment of the invention, the input unit includes a first data selector for selecting image processing operation setting data to be executed by the image processing apparatus, from a plurality of data obtained by the data obtaining unit so that the image processing apparatus obtains a plurality of image processing operation setting data and selects any of them. Otherwise, the input unit may be provided with a second data selector for selecting image processing setting data to be obtained from the terminal device, from a plurality of image processing setting data stored in the terminal device so that only the image processing setting date to be executed by the image processing apparatus, are selectively obtained from the plurality of image processing setting data stored in the terminal device.

According to yet another aspect of the embodiment of the present invention, the image processing apparatus may further comprises a name obtaining unit for obtaining, from the terminal device, names identifying the image processing operations set on the terminal device, upon selection of the image processing operations by the first or second data selector. The image processing apparatus may further comprises a name display unit for displaying the schedule of the obtained names of image processing operations as candidates to be selected by the first or second data selector.

With such provision of the name obtaining unit and the name display unit, if the user registers the image processing operations along with name that can be recognized easily, he or she may select desired image processing operations more easily since he or she may select the image processing operations by the names on the image processing apparatus.

According to further aspect of the embodiment of the present invention, the image processing apparatus may comprises a image processing operation setting unit which sets image processing operations to be executed by another image processing apparatus. With this setting unit, when different types of image processing apparatus are interconnected with each other and image processing operations are set on one of the image processing apparatus to which the use has been accustomed in image processing operation setting, the other of the image processing apparatus may obtain the data of the image processing operations from the accustomed image processing apparatus. Then the user may easily operate the image processing apparatus which he or she is not accustomed to use, utilizing the image processing operation data set on the image processing apparatus to which he or she has been accustomed.

According to yet further aspect of the present invention, the invention may be carried out in the form of a program product for setting image processing operations to be executed by a terminal device interconnected with an image processing apparatus to communicate with the image processing apparatus. The program may be designed to make the terminal device or other information processing device perform a process comprising registering data of one or more image processing operations to be executed by the image processing apparatus, storing the registered image processing operation data, transmitting one or more of the image processing operation data to the image processing apparatus in response to a request from the image processing apparatus.

With that program, the user may easily set image processing operations for different types of image processing apparatus on the terminal device or other information processing device to which he or she has accustomed to use, even if the image processing apparatus requires different manner of setting operations.

The program may include a process of converting the image processing operation data into data of a format adapted for the image processing apparatus which receives the image processing operation data. This process is necessary when different types of image processing apparatus are interconnected with the terminal device or other information processing device, with the image processing apparatus having different formats of the image processing operation data but the image processing apparatus not having a function of converting the received image processing operation data into data of formats adapted to themselves.

The program may further include a process of registering image processing operation names corresponding to set or registered image processing operations, and transmitting data of the names to the image processing apparatus in response to a request from the image processing apparatus.

With such provision of the name setting or registering and name data transmitting process, if the user registers the image processing operations along with name that can be recognized easily, he or she may select desired image processing operations more easily since he or she may select the image processing operations by the names indicated on the image processing apparatus.

The present invention may take the form of an image processing system in which the image processing apparatus is interconnected with a terminal device or other information processing device which executes the above mentioned program.

The above and further objects and novel feature of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWING

FIG. 3 illustrates an example of an initial display shown on a copier X according to an embodiment of the present invention.

FIG. 7 is a flowchart showing modified operation of the copier.

DETAILED DESCRIPTION OF A PREFERRED EMBODIMENT

Figure 1:
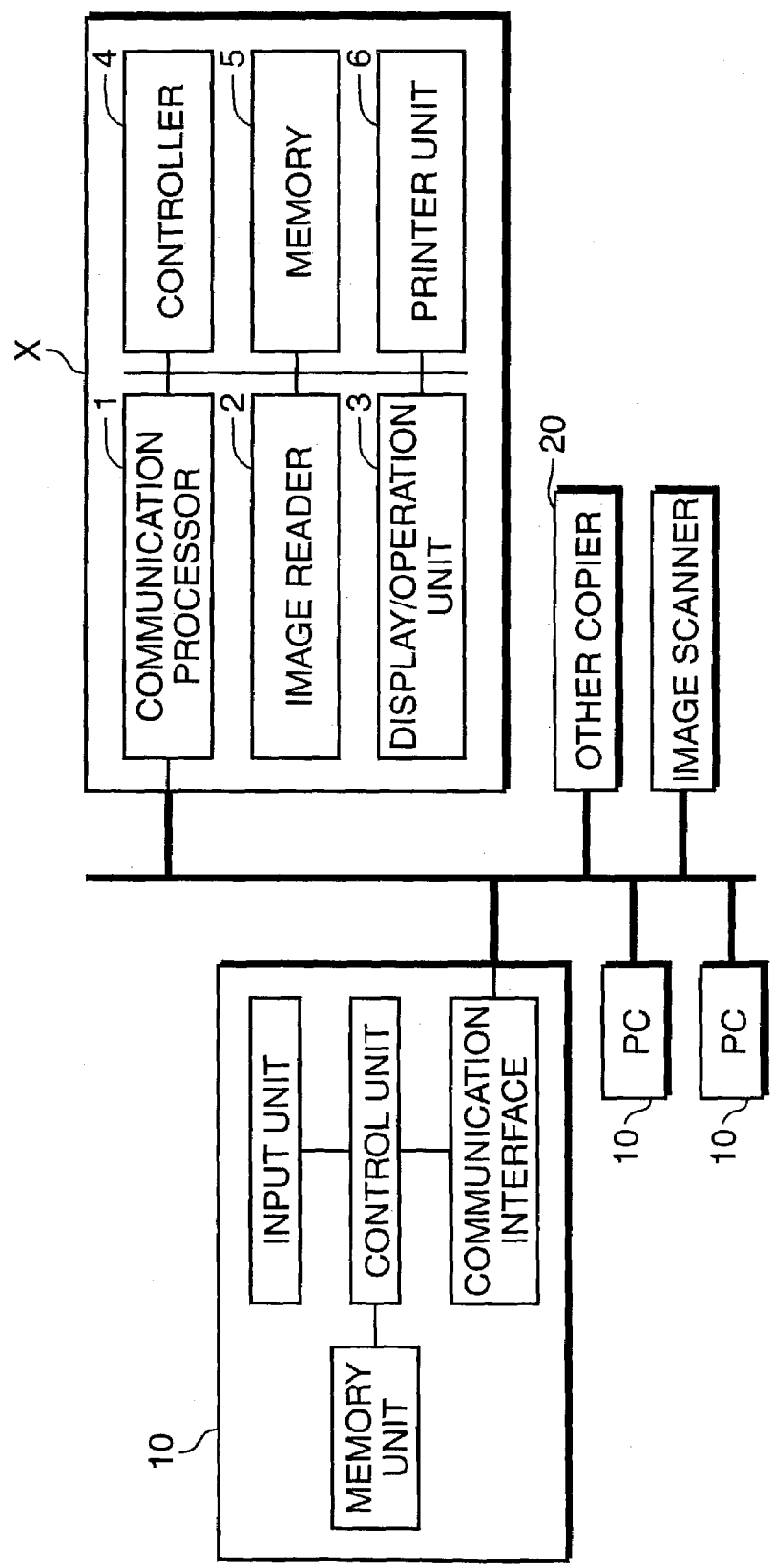
FIG. 1 is a block diagram schematically illustrating an image processing apparatus and an image processing system including the apparatus as a component, according to an embodiment of the present invention.

With reference to FIG. 1, explanation will be made schematically first about a construction of a copier X as an example or representative of the image processing apparatus according to an embodiment of the present invention.

In addition to ordinary copying function for reading an image of an original and copying or printing the image on a paper, the copier X has a function of an image scanner for storing image data in a file, and a function of facsimile for transmitting the image data. Thus, the copier X is a compound type copy machine and may be regarded as an example of image processing apparatus. The copier X is interconnected with personal computers (PCs) 10 and other image processing apparatus through LAN to form an image processing system. The personal computers 10 and other image processing apparatus function as terminal devices in the image processing system.

The copier X comprises a communication processor 1, an image reader 2 for reading image of an original placed on an original supporting platform or ADF (automatic document feeder) (not shown), a display/operation unit 3 including a LCD (liquid crystal display) touch panel and operating buttons for the input of various data and display of data, controller 4 for the operation and control of image processing operation of the copier X, a memory 5 for storing various data, and a printer unit 6 for printing an image on a document or a sheet of paper. The controller 4 is composed of a CPU, ROM, RAM and other electronic components to make operation and control of the image processing operation of the image processing apparatus in accordance with programs stored in the ROM. The memory 5 includes a hard disk drive or other memory device for storing image data read by the image reader 2, and various data to be processed by the communication processor 1 and the controller 4. The printer unit 6 responds to a control command from the controller to print an image data stored in the memory 5 or an image data read by the image reader 2. The memory 5 also stores a process control program for controlling the process of the printing operation, with control program being adapted for each process.

The personal computer 10 comprises a display unit such as a CRT or LCD, an input unit including a keyboard and mouse, a control unit for making various operations, a memory unit including a hard disk drive and other memory device, and a communication interface for controlling the communication through the LAN data bus. To the personal computer 10 is inputted by means of the input unit of the personal computer, image processing operation data for the image processing operations executed by the copier X. The image processing operation data thus inputted are stored in the memory unit and transmitted to the copier X in response to a command or request from the copier X. A program for the input, storage and transmission of the image processing operation data, is installed in the personal computer 10 in advance.

Figure 2:
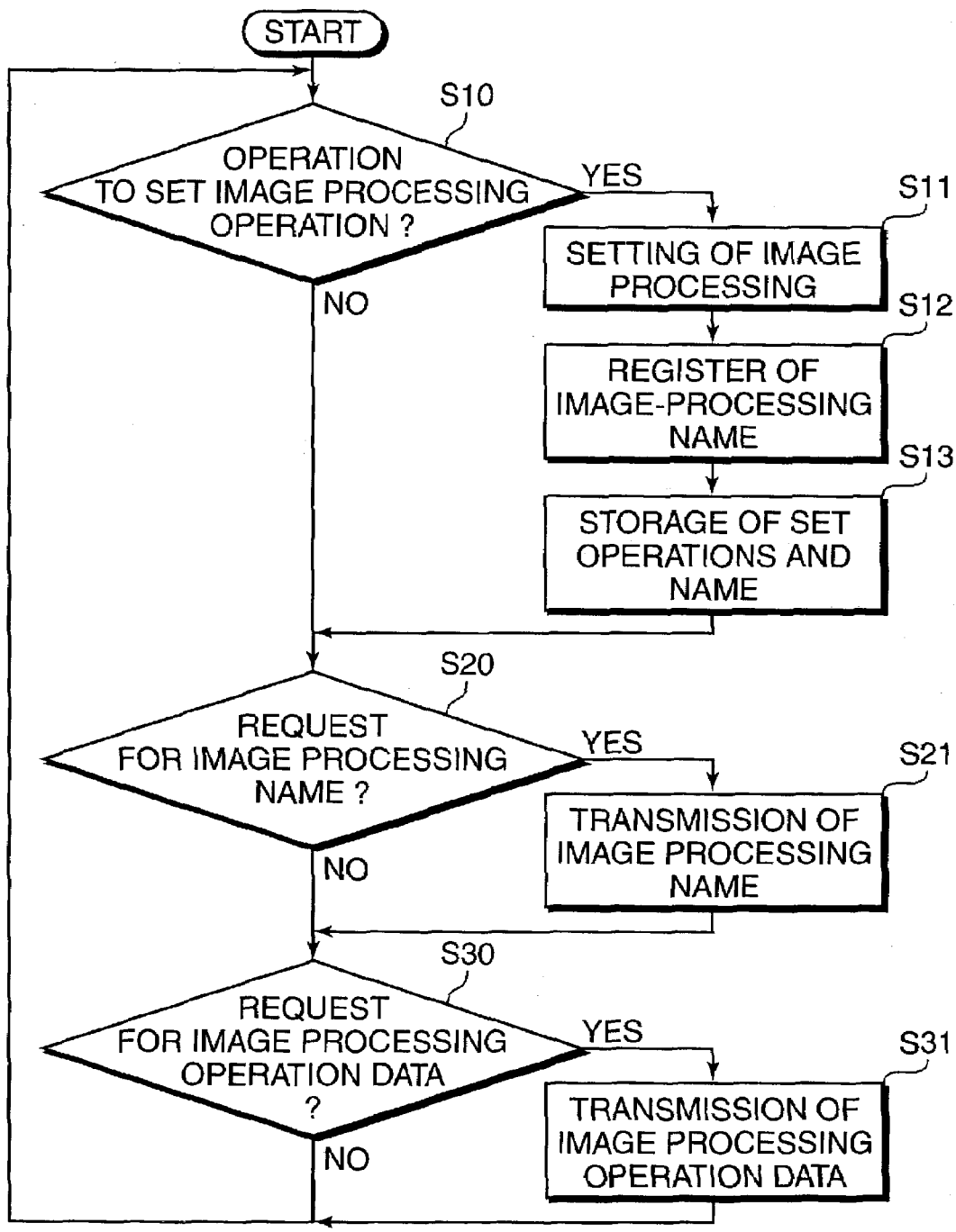
FIG. 2 is a flowchart showing a process to be executed by a program in a personal computer interconnected with the image processing apparatus according to an embodiment of the present invention.

Next, referring to FIG. 2, explanation will be made of the process executed by the personal computer 10 in accordance with the program installed in the personal computer 10. Although not shown in the flowchart, it is assumed that the process shown in FIG. 2 is initiated by a initiating operation made on the personal computer 10 by means of the input unit, and is terminated in response to a termination operation. (not shown) The reference marks S10 through S31 denote the steps of the process executed by the personal computer 10. At first stage, it is determined if an operation has been made to initiate an image processing operation setting or registration. (S10) If it is determined that such an operation has been made, the display unit of the personal computer 10 displays a setting page or window for the setting of image processing operations, allowing the user to set desired image processing operation data. (S11)

The image processing operation data to be set at the step S11 may include the data of the image processing operations to be executed by the copier X, for example, setting of one-side (simplex) or two-side (duplex) print, setting of margins, setting of a collective or gathering print (a printing of a plurality of images read from a plurality of originals on a single copy paper with the images being contracted), and a setting of combination of those settings.

Then, name for each setting made at step S11 (hereinafter called as an image-processing name) is registered. (S12) The image-processing names may be any which the user likes.

After the image processing operation data and their corresponding image-processing names are stored in the memory unit of the personal computer 10 with the data and names being associated with each other, the process proceeds to step S20. If it is determined at step S10 that an operation has not been made to initiate an image processing operation setting or registration, the process also proceeds to S20.

Figure 4A:
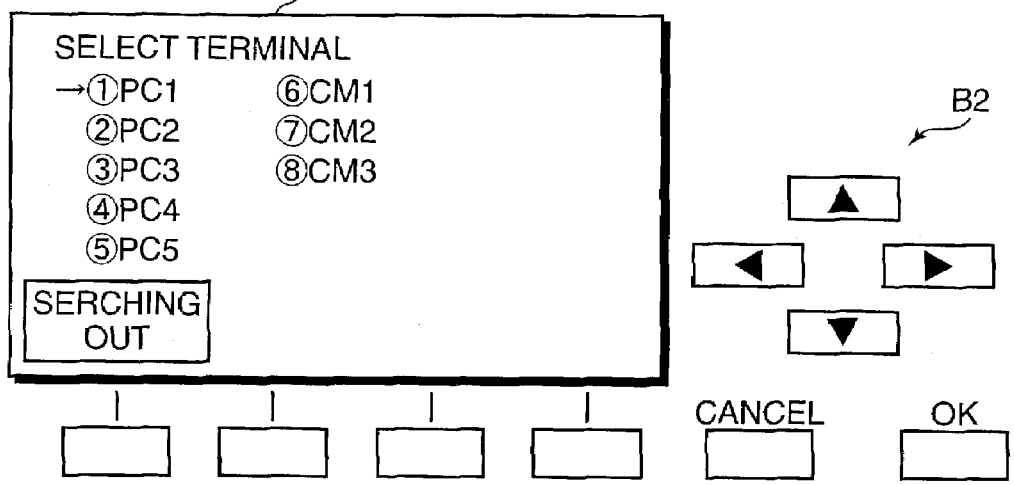
FIG. 4 illustrates an example of a display for the selection of image processing operation, shown on a copier X according to an embodiment of the present invention.
Figure 4B:
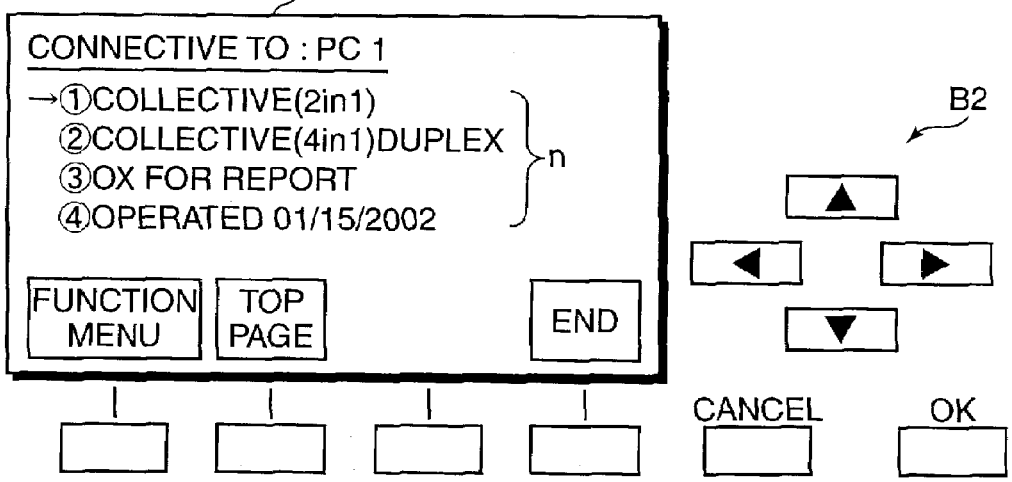

At the step 20, it is determined if request for the image-processing names has been made from any of the copiers 10. When it is determined that such request has been made by a copier X, data of all the image-processing names stored in the memory are transmitted to the copier X that made the request, and the process proceeds to step S30. The data of the image-processing names thus transmitted are displayed on the copier X as shown in FIG. 4B for the selection of image processing operations to be executed by the copier X as will be described later in more detail. When it is determined that the request of the name transmission has not been made, the process also proceeds to step S30.

At step 30, it is determined if the image processing operation data have been requested with the image-processing names (or other data corresponding to them) being designated. If it is determined that such a request has been made, requested image processing operation data are transmitted from the personal computer to the copier X, and the process returns to step S10 and the same operation is repeated. If it is determined that such request of data transmission has not been made, the process will return to the step S10 without transmission of the data.

Then, explanation will be made about the operation of the copier X with reference to FIGS. 3 through 6. FIG. 3 schematically illustrates display/operation panel of the copier X. The reference mark W denotes a menu display window, which, in FIG. 3, displays initial page displayed upon initiation of the copier. On the right of the menu display window W, moving buttons B2 are arranged to move the cursor C (see FIG. 4) up and down and right and left. When any one of the buttons B2 is pushed down or operated, the cursor C moves in the direction indicated on the operated button. In this way, the user may move the cursor to make the cursor register with a desired item in the menu displayed on the display window. Then, if the user operates OK button located under the moving button B2, the selected item of the menu is executed. Adjacent to the OK button is provided a cancel button for canceling operation and settings. Below the display window W are arranged selection buttons S1 through S4 for selecting an item of menus displayed on the display window W. If the button S1 just below the item of PC connection, is operated, the display window displays a page for the selection of PC and other terminal as will be described later. (see FIG. 4A)

The reference numeral M denotes operation mode selection buttons for the copier X. When any one of the buttons M is operated, a mode assigned to and indicated on the button is selected and set on the copier X, with a lamp or other light emitting element adjacent to the button being lit or energized. In the embodiment shown in the Figure, a button M1 is assigned to selection of copy mode, a button M2 is assigned to scan mode for transmitting read image data, and a button M3 is assigned to printer mode for carrying out printing in accordance with data received from a terminal device such as a personal computer. Reference numeral TK denotes ten keys for setting desired number, such as a number of pages or sheets to be copied. The reference numerals RC and SC respectively denotes a reset button and a stop clear button which are known per se.

Although the present embodiment is arranged such that with various buttons being operated with reference to display on the display window, a touch panel may be employed in lieu thereof wherein menu of candidates to be set, selected, and/or executed, are displayed on a screen and setting, selection, and execution of various operation are made with any of the candidates being touched by a finger or a touch pen.

Figure 5A:
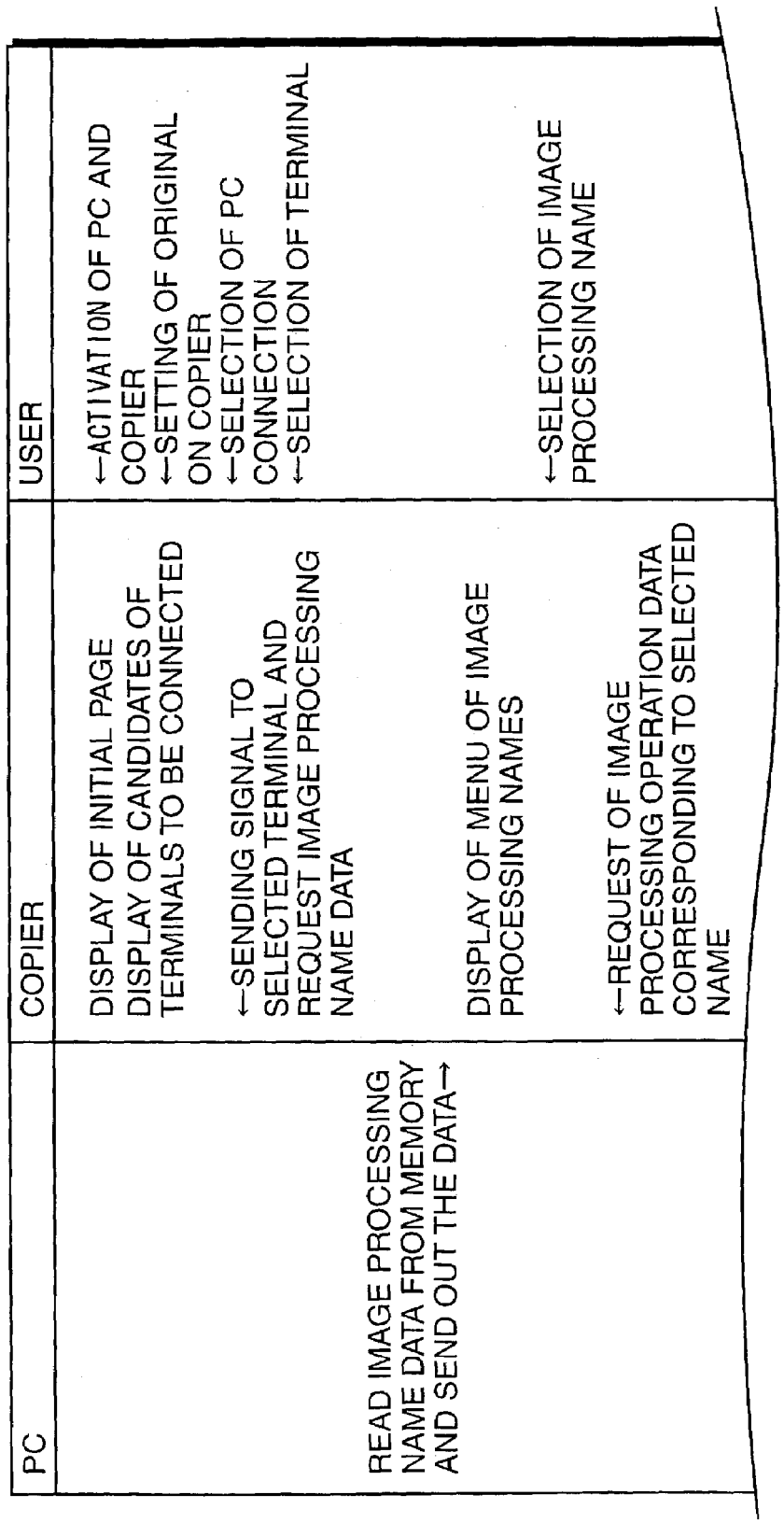
FIG. 5 is a table showing interactions between the copier, the personal computer and a user.
Figure 6A:
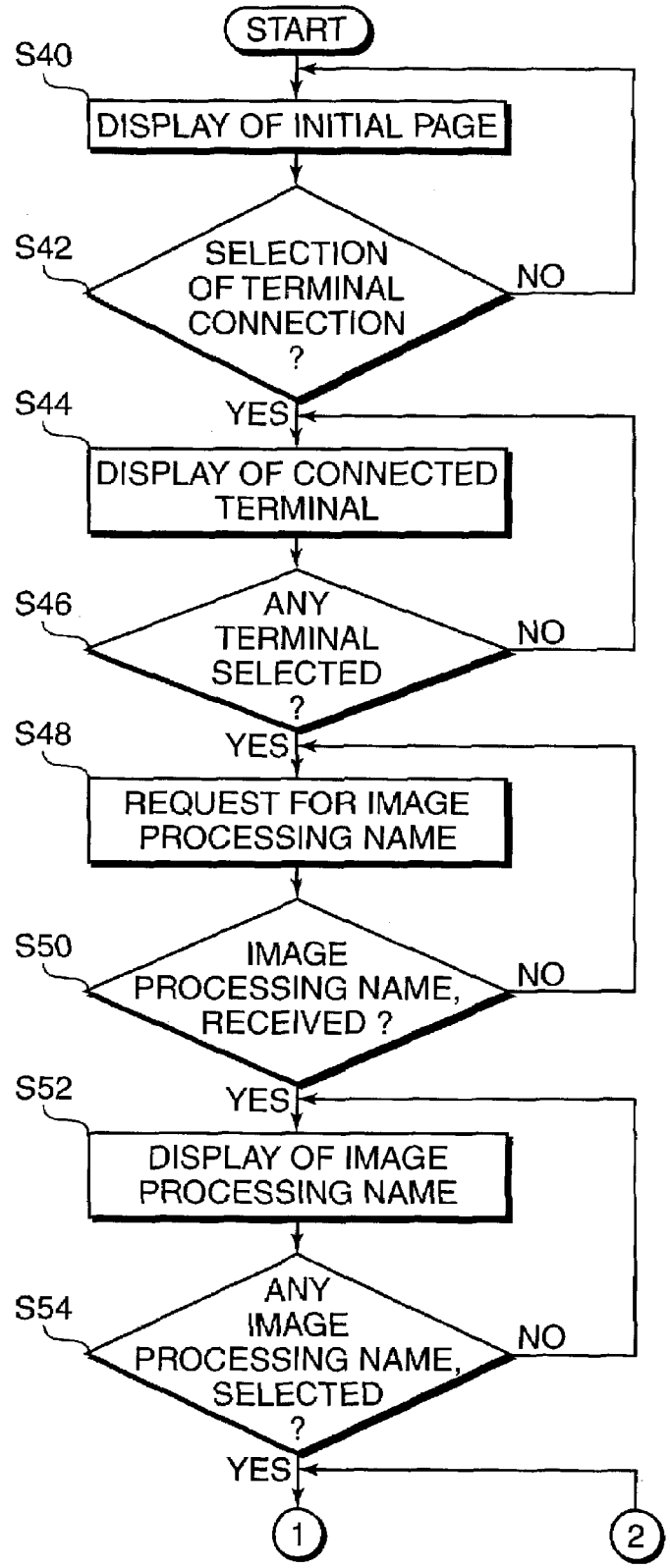
FIG. 6 is a flowchart showing the operation of the copier for the image processing.
Figure 6B:
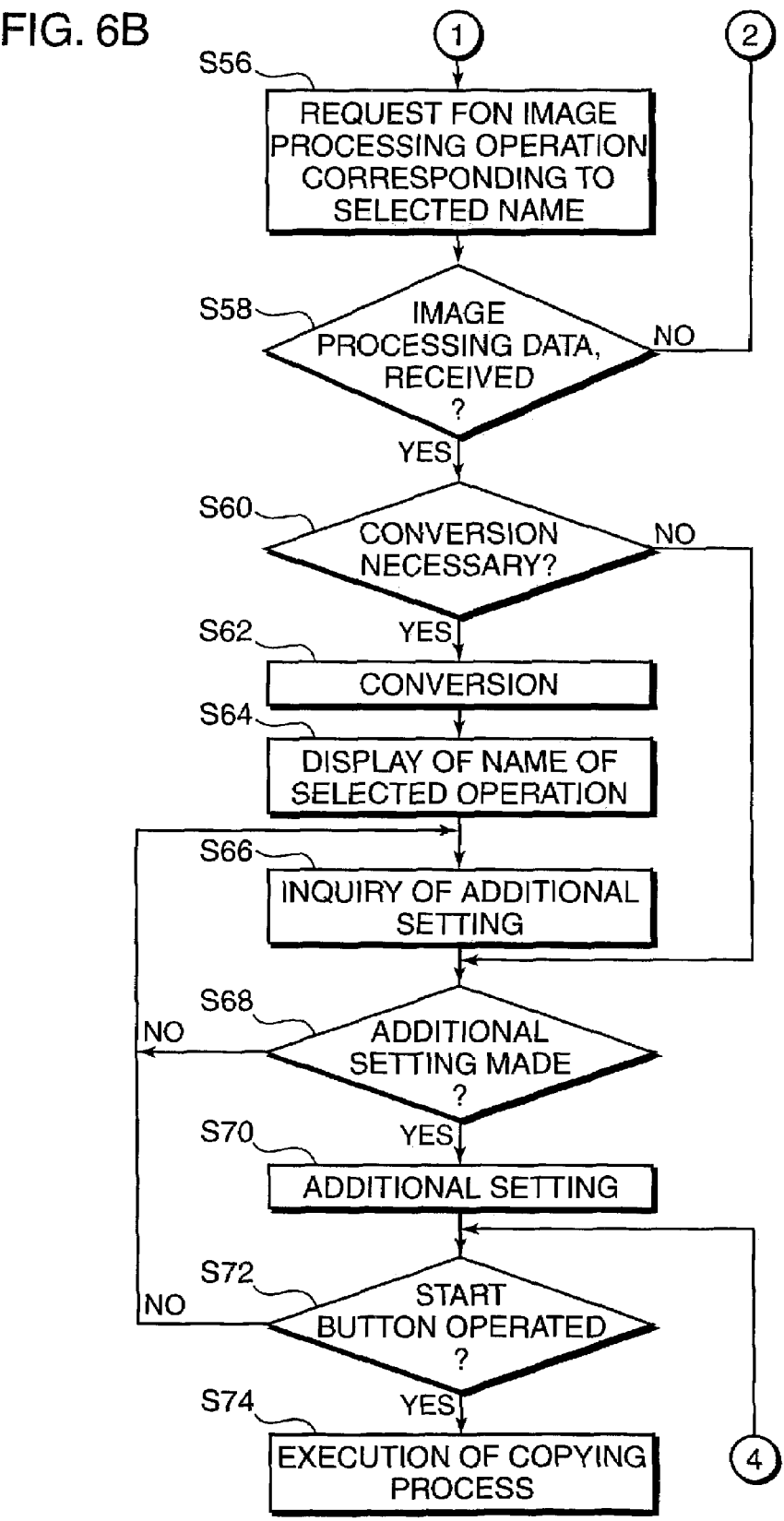

FIG. 5 is a table showing interactions between the copier, the personal computer and a user. In the table, the arrows show indication or commands, requests, selections and data transmission are made in the direction of the arrows. FIG. 6 is a flowchart showing operation or process executed by the copier.

When the user activates the copier, the display window W displays an initial page as shown in FIG. 3. At this time, it is assumed that at least one personal computer 10 is interconnected with the copier X through a LAN, and has been activated to be in operation. The user may set an original on an original supporting platform, document table of the copier or an automatic document feeder (ADF), and operates the button S1. Then the communication processor 1 refers to the terminals including the personal computers 10, other copiers and image scanner that are connected with the copier X through LAN, and the display/operation unit 3 displays the menu or schedule of the terminals on the display window W as shown in FIG. 4A. In FIG. 4A, PC1 through PC5 denote personal computers and their users, CM1 and CM2 show other copiers, and IS1 shows an image scanner.

With the display shown in FIG. 4A, the user may operate the moving button B2 to move the cursor C to a desired terminal, e.g. the user's own personal computer PC1, and operate the OK button. Then, the communication processor 1 requests the selected terminal e.g. the user's personal computer 10 to send the image processing names. In response to the request, the personal computer 10 send the data of the image processing names to the copier X which, in turn, displays the schedule of the image processing names n as shown in FIG. 4B, by means of the display/operation unit 3. Referring to FIG. 4B, the messages next to the circled numbers ① to ④ are the image processing names of which data are set or registered in the personal computer 10 and are the candidates to be selected.

Figure 4C:
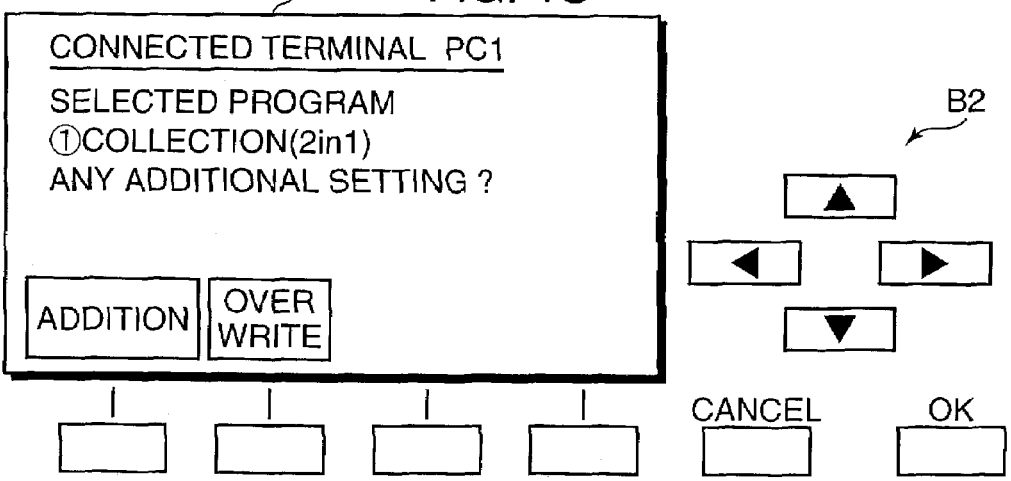

The user may operate the moving button B2 observing the display as shown in FIG. 4B and register the cursor with a desired one of the image processing names n. If the user operates the OK button, registering the cursor with the desired image processing name, the communication processor 1 requests the selected personal to send a image processing operation setting data corresponding to the selected image processing name. In response to the request, the personal computer 10 sends the requested data to the copier X which, in turn, receives the data and converts it into data of a format adapted for the copier X, i.e. of the format to be processed by the copier X. Then the copier X displays the selected terminal and the image processing name corresponding to the received image processing operation data, along with a message asking if additional setting is necessary or not, as shown in FIG. 4C. The user, then, inputs to the copier X that additional setting is not necessary, or sets necessary additional setting or settings by means of setting device or devices which are inherent to the copier S and are well-known per se in the art. The additional setting may be such addition of two-side or duplex copies to the setting of 2 in 1 collective copy.

When the start button B3 is operated with the settings as mentioned above, the copier X read out a program of the process to be executed in accordance with the image processing operation setting data as converted, and execute the program to carry out printing operation, i.e. reading the image of the original by means of the image reader 2 and printing the read image on a sheet of paper by means of the printer unit 6.

Thus, the copier X obtains from a terminal device such as the personal computer 10, the image processing operation data pre-set on the terminal (in the present embodiment, setting regarding copying process such as duplex printing and collective copying), and executes printing operation. Accordingly, the user can easily set desired image processing operations by means of his or her personal computer to which he or she has accustomed to, even if he or she is not familiar with the operation of each copier 10.

In addition, as display is made of the image processing names n set or registered optionally in advance, in correspondence with the image processing operations, for the selection of the image processing operations, it is easy to see the image processing operations for the selection and setting.

In the embodiment described above, for the selection of the image processing operation data, the copier X is arranged to obtain, from the personal computer 10, only the image processing operation data selected from the plurality of the candidate data corresponding to the image processing names n displayed as in FIG. 4B. Instead thereof, the copier may be arranged to obtain all the image processing operation data from the personal computer 10, and the selection is made by the copier X itself for the execution of image processing operations selectively set on the copier X. In this case, in response to request from the copier X, the personal computer 10 sends to the copier X, all of image processing operation data corresponding to image processing names, along with the data of all the image processing names. The copier X, on the other hand, may select image processing operation data in response to user's operation, with the selected data being set on the copier X for the execution.

According to the embodiment described above, the copier X is arranged, for the selection of the image processing operations, to display schedule of image processing names as optionally set on the personal computer as shown in FIG. 4B. In lieu thereof, the copier X may be arrange such that the selection of the image processing operations is to be made by means of numbers (1,2,3, . . . ) or marks (A, B, C, . . . ) assigned to respective image processing operations in advance. This arrangement is applicable to a copier without a display, such as a LCD display, for displaying messages or trains of letters. Such a copy may be arranged such that the user may select the image processing operations by means of numeric keys or the like.

Further, the image processing system according to the embodiment as mentioned above, is arranged such that the copier X converts the image processing operation data into data of the format adapted for the copier X. As an alternative, the personal computer may be arranged to convert the data before it send the data to the copier X such that the data being send are adapted for the copier X. In this case, the program of the personal computer may be provided with a process to obtain, from the copier X, the data of the format of the image processing operation data adapted for the copier X, and convert the data stored in the personal computer into data adapted for the copier X.

In the system according to the embodiment described above, the copier X obtains the image processing operation data from the personal computer. The functions of the personal computer, e.g. the functions of setting of the image processing operation data and transmitting the data to the copier, may be provided in other image processing apparatus 20, e.g. another copier, connected with the copier X through LAN such that the copier receives the image processing operation data from the other image processing apparatus 20. For example, different types or kinds of copiers may respectively be provided with functions of the image processing operation data setting, transmitting the data and converting the data to appropriate format. Then, even if the personal computer is not provided with such functions, the copiers communicate with each other through LAN. With this arrangement, the user may set the image processing operation data on a copier to which he or she has been accustomed, while the other copier may obtain the image processing operation data from the accustomed copier even if the user is not accustomed to the operation of the other copier.

Although the embodiment was described with reference to a personal computer as a representative of the terminal device, and a copier as a representative of an image processing device, the present invention is not limited to those representatives, but may be applicable to other types of the terminal device, data processing device and image processing device. For example, the terminal device may include other types of work station, severs, facsimile machines, and other copiers. Besides the copier, the image processing device may include image scanner, facsimile machine, a combination of an image scanner and a printer.

As described above, according to the present invention, even if the user is not accustomed to an image processing apparatus with which he or she is going to make image processing such as printing of an original image, he or she may set image processing operation data with a terminal such as a personal computer or other image processing apparatus to which he or she has been accustomed. Then, he or she may make the not-accustomed image processing apparatus execute the image processing operation only by making the not-accustomed image processing apparatus obtain image processing operation data from the accustomed terminal, thereby facilitating operation of an image processing apparatus, or a plurality of image processing apparatus, irrespective of the difference of the type, kinds, manner of operation of the image processing apparatus.

This application is based on Japanese patent application No. 2002-055663 filed on Mar. 1, 2002, the contents of which are hereby incorporated by references.

Having described my invention as related to the embodiment shown in the accompanying drawing, it is my intention that the invention be not limited by any of the details of description, unless otherwise specified, but rather be construed broadly within its spirit and scope as set out in the accompanying claims.

What is claimed is:

1. An image processing system, comprising:
   a first copier including a printer unit for performing selective print processings, and a display/operation unit for displaying processing names representing said selective print processings to allow a user to set a desired print processing of said selected print processings to be executed by the printer unit of the first copier, the display/operation unit being operable to selectively display original processing names which have been specializedly made for the first copier and externally-made processing names which have been made outside of the first copier;
   a second copier including a printer unit for performing selective print processings, and a display/operation unit for displaying processing names representing said selective print processings to allow a user to set a desired print processing of said selected print processings to be executed by the printer unit of the second copier, the display/operation unit being operable to selectively display original processing names which have been specializedly made for the second copier and externally-made processing names which have been made outside of the second copier, the original processing names of the second copier being different from the original processing names of the first copier; and
   a terminal communicating with the first and second copiers, the terminal including an input unit for inputting data of desired processing names, and a memory for storing the inputted desired processing names, and a controller for transmitting the data of at least a portion of the desired processing names to the first or second copier in response to display selection by the user of the externally-made processing names at the first or second copier, so that the display/operation unit of the first or second copier displays the desired processing names as the externally-made processing names.

2. An image processing system according to claim 1, wherein.
   the input unit is adapted for inputting data of print processings to be executed by the printer unit of the first or second copier;
   the controller transmits the data of the print process sings to the first or second copier; and
   each of the first and second copier includes a data obtaining unit for obtaining the data of the print processings transmitted from the terminal.

3. An image processing system according to claim 2, wherein each of the first and second copiers further includes a converter for converting the data of the print processings into data suitable to the copier.

* * * * *